(12) United States Patent
MacNamara et al.

(10) Patent No.: US 10,805,242 B2
(45) Date of Patent: Oct. 13, 2020

(54) TECHNIQUES FOR A CONFIGURATION MECHANISM OF A VIRTUAL SWITCH

(71) Applicant: Intel Corporation, Santa Clara, CA (US)

(72) Inventors: Chris MacNamara, Limerick (IE); Mark D. Gray, Shannon (IE); Andrew Cunningham, Ennis (IE); Pierre Laurent, Quin (IE)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 15/390,329

(22) Filed: Dec. 23, 2016

(65) Prior Publication Data

US 2018/0183659 A1 Jun. 28, 2018

(51) Int. Cl.
*H04L 12/931* (2013.01)
*G06F 9/50* (2006.01)
*H04L 12/24* (2006.01)
*G06F 9/455* (2018.01)

(52) U.S. Cl.
CPC .......... *H04L 49/70* (2013.01); *G06F 9/45558* (2013.01); *G06F 9/5077* (2013.01); *H04L 41/0896* (2013.01); *H04L 41/5009* (2013.01); *G06F 2009/4557* (2013.01)

(58) Field of Classification Search
CPC ..... H04L 41/0803; H04L 41/22; H04L 43/08; H04L 49/70
See application file for complete search history.

(56) References Cited

U.S. PATENT DOCUMENTS

| | | | |
|---|---|---|---|
| 9,921,880 B2 * | 3/2018 | Michael | G06F 9/5027 |
| 2003/0081620 A1 * | 5/2003 | Danner | H04L 43/00 370/400 |
| 2013/0198743 A1 * | 8/2013 | Kruglick | G06F 9/45558 718/1 |
| 2016/0210175 A1 * | 7/2016 | Morimura | G06F 9/5077 |
| 2016/0291999 A1 * | 10/2016 | Antony | G06F 16/178 |
| 2017/0220389 A1 * | 8/2017 | Michael | H04L 67/10 |
| 2018/0109416 A1 * | 4/2018 | Lim | H04L 41/0806 |

* cited by examiner

*Primary Examiner* — Mohamed A. Wasel
(74) *Attorney, Agent, or Firm* — Compass IP Law PC (57) ABSTRACT

Examples include techniques for a configuration mechanism of a virtual switch. Example techniques include monitoring a database including parameter to configure a virtual switch at a computing platform hosting a plurality of virtual machines or containers. Changes to one or more parameters may cause changes in allocations of computing resources associated with supporting the virtual switch.

22 Claims, 8 Drawing Sheets

Partial Table 300

| Parameter | Requirements |
|---|---|
| Flow-Limit | Value 310 |
| I/O Bandwidth | Value 330 |
| Workload Maximum | Value 340 |
| | |

```
MONITOR, AT A PROCESSOR CIRCUIT, A DATABASE
MAINTAINING PARAMETERS FOR CONFIGURING A VIRTUAL
SWITCH AT A COMPUTING PLATFORM HOSTING A PLURALITY
OF VMs OR CONTAINERS
602
```

```
DETERMINE WHETHER THE PARAMETERS FOR
CONFIGURING THE VIRTUAL SWITCH HAVE BEEN CHANGED
TO INDICATE THAT ADDITIONAL COMPUTING RESOURCES AT
THE COMPUTING PLATFORM ARE TO BE ALLOCATED TO THE
VIRTUAL SWITCH
604
```

```
IMPLEMENT A STATIC CHECK OR A DYNAMIC CHECK TO
DETERMINE WHETHER OR NOT TO ALLOCATE THE
ADDITIONAL COMPUTING RESOURCES, THE STATIC CHECK
INCLUDING ESTIMATING THE ADDITIONAL COMPUTING
RESOURCES NEEDED BASED ON A STATIC MODEL, THE
DYNAMIC CHECK INCLUDING RUNNING A SELF TEST FOR A
REPRESENTATIVE WORKLOAD EXECUTED BY THE PLURALITY
OF VMs OR CONTAINERS TO DETERMINE WHETHER THE
ADDITIONAL COMPUTING RESOURCES NEEDED
606
```

```
ALLOCATE THE ADDITIONAL COMPUTING RESOURCES TO
CONFIGURE THE VIRTUAL SWITCH BASED ON THE STATIC
OR DYNAMIC CHECK
608
```

*FIG. 6*

Storage Medium 700

*Computer Executable Instructions for 600*

TECHNIQUES FOR A CONFIGURATION MECHANISM OF A VIRTUAL SWITCH

BACKGROUND

Computing platforms such as those commonly used in today's telecommunication networks may have hardware platforms arranged for fixed functions and dimensioned for worst case requirements related to latency, maximum supported input/output (I/O) ports and highest supported data bandwidth. These worst case requirements may be set at computing platform design time. In some examples, each computing platform (e.g., a blade) may be arranged to support a single network function for a telecommunication network. The single network function may include multiple software applications. Typically, applications and associated hardware to support these applications may be tightly coupled and deployed as a single network function.

In contrast to computing platforms deployed in today's telecommunication networks, network function virtualization (NFV) computing platforms to be deployed in future telecommunication and/or data center networks may be designed to host many different virtual network functions (VNFs) as well as many different application types running in or being executed by virtual machines (VMs) and/or containers to support VNFs. As a result, requirements for NFV computing platforms may vary and are likely not fully defined at time of computing platform design or definition. Also, each hosted application may have its own service level agreement (SLA) requirements such as requirements for latency, bandwidth, compute resources or I/O. A VNF may be supported by several VMs and in a fluid NFV environment, these supporting VMs and/or containers may have peer VMs or containers located on a same hosting computing platform or remotely deployed on a different and/or a remote hosting computing platform.

DETAILED DESCRIPTION

As contemplated in the present disclosure, a VNF may be supported by one or more VMs in a fluid NFV environment. A fluidity of deployment of VMs to support VNFs may lead to dimensioning challenges for configuring computing platforms hosting these VMs. Dimensioning may refer to how physical or virtual resources at a computing platform may be allocated at a computing platform to host VMs supporting one or more VNFs. These dimensioning challenges may include, but are not limited to, unpredictable latency changes based on a load to a computing platform directly related to VNF workloads that are not always known in advance. For example, memory load latency increases when memory bandwidth utilization increases for a given VNF workload. In a case were a computing platform hosts multiple VMs (e.g., associated with multiple tenants), the VMs may impact each other's performance and potentially violate SLAs based on their respective VNF workloads. Also, multi-platform types of networks such as those included in today's data centers and possible used in NFV telecommunication networks may have computing platforms including central processing units (CPUs) that differ in various ways such as, but not limited to, number of cores, operating frequency, instruction set or I/O processing capabilities. Other resources of these multi-platform types may also differ such that impacts from CPU and/or other resource variability may be difficult to determine.

A virtual switch hosted by a computing platform may be a key piece of infrastructure to enable VMs supporting VNFs to meet performance requirements. Inter-VM communications and/or ingress and egress data packets transverse a virtual switch. However, due to the difficulties associated with determining resource needs to meet performance requirements, a virtual switch may be manually configured to use a fixed number of computing resources such as a fixed number of CPU cores. Use of a fixed number of physical computing resources may be akin to traditional approaches of fixing hardware at time of computing platform design and is problematic to meeting performance requirements in a fluid VM deployment environment.

Figure 1:
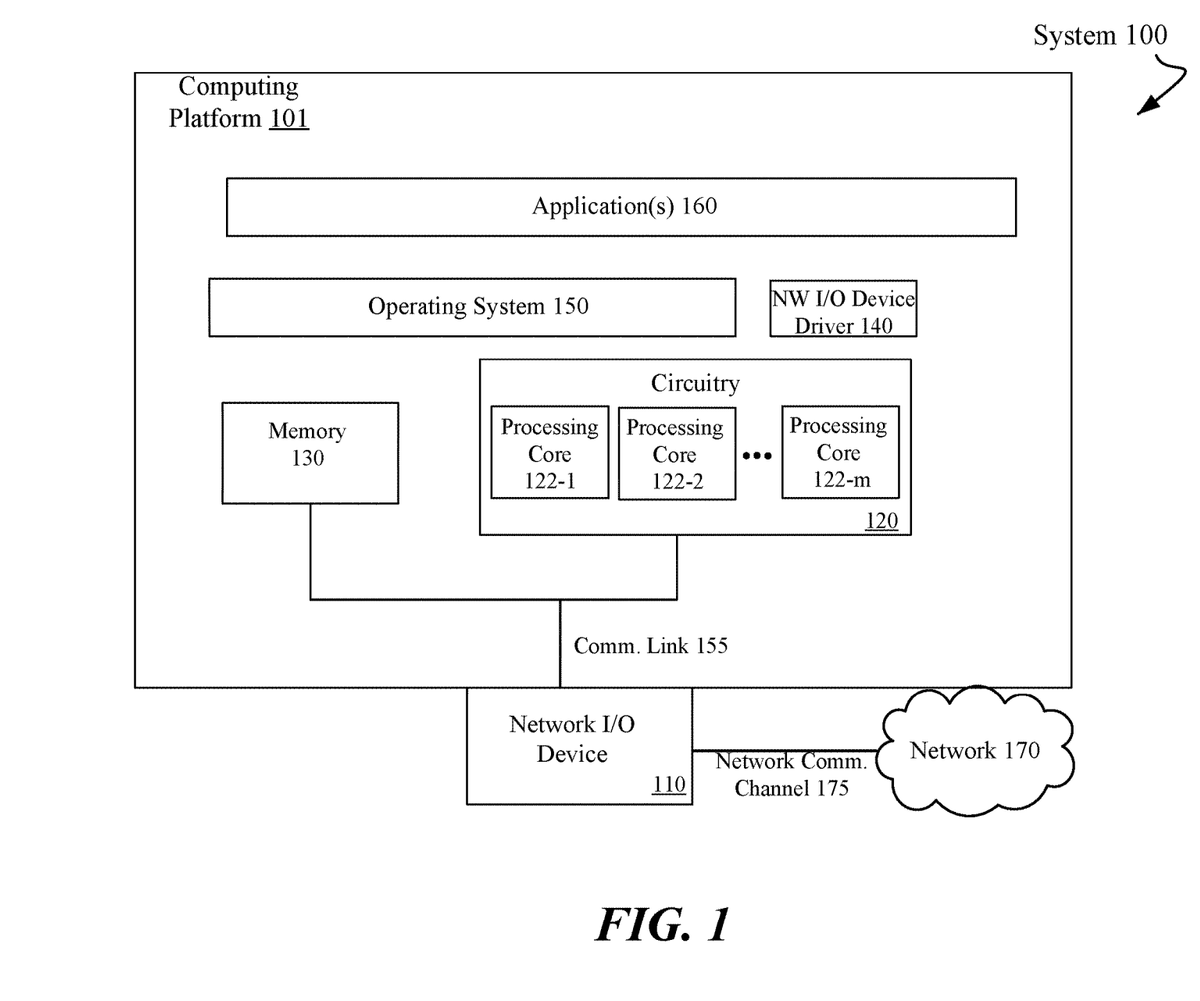
FIG. 1 illustrates a first example system.

FIG. 1 illustrates an example first system. As shown in FIG. 1, the example first system includes system 100. Also as shown in FIG. 1, system 100 includes a computing platform 101 coupled to a network 170. In some examples, as shown in FIG. 1, computing platform 101 may couple to network 170 via a network communication (comm.) channel 175 and through a network IO device 110 (e.g., a network interface card (NIC)) having one or more ports connected or coupled to network comm. channel 175.

According to some examples, computing platform 101, as shown in FIG. 1, may include circuitry 120, memory 130, a network (NW) I/O device driver 140, an operating system 150 or one or more application(s) 160. In some examples, as shown in FIG. 1, circuitry 120 may communicatively couple to memory 130 and network I/O device 110 via comm. link 155. Although not shown in FIG. 1, in some examples, operating system 150, NW IO device driver 140 or application(s) 160 may be implemented at least in part via cooperation between one or more memory devices included in memory 130 (e.g., volatile memory devices) and elements of circuitry 120 such as processing cores 112-1 to 112-$m$, where "m" is any positive whole integer greater than 2. Application(s) 160 may be associated with one or more VNFs supported by VMs (not shown) hosted by computing platform 101.

In some examples, computing resources of computing platform 101 such as, but not limited to, circuitry 120, memory 130 and network I/O device 110 may be allocated to enable one or more VMs to support one or more VNFs. As described more below, allocation of these computing resources may be related to virtual switch (vSwitch) dimensioning triggered by requirements changes (e.g., initiated by a network management system). Also, as described more below, dimensioning may be based on a dynamic check that self-tests a computing platform's ability to meet performance requirements (e.g., SLAs) using a representative set of data traffic routed before actually applying configuration changes.

According to some examples, dimensioning may also be based on a static check that may not involve a self-test, but rather may statically estimate, via models, whether performance requirements may be met before applying configuration changes. Choosing dynamic or static checks may be based, at least in part, on potential impacts of self-tests degrading performance below an acceptable level during these self-tests such that a static estimate may be used to avoid the unacceptable degradation of performance.

In some examples, computing platform 101, may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Also, circuitry 120 having processing cores 122-1 to 122-m may include various commercially available processors, including without limitation an AMD® Athlon®, Duron® and Opteron® processors; ARM® application processor embedded and secure processors; IBM® and Motorola® DragonBall® and PowerPC® processors; IBM and Sony® Cell processors; Qualcomm® Snapdragon® processors; Intel® Atom®, Celeron®, Core (2) Duo®, Core i3, Core i5, Core i7, Itanium®, Pentium®, Xeon® or Xeon Phi® processors; and similar processors.

According to some examples, memory 130 may be composed of one or more memory devices or dies which may include various types of volatile and/or non-volatile memory. Volatile memory may include, but is not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as 3-D cross-point memory that may be byte or block addressable. These byte or block addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above, or other non-volatile memory types.

Figure 2:
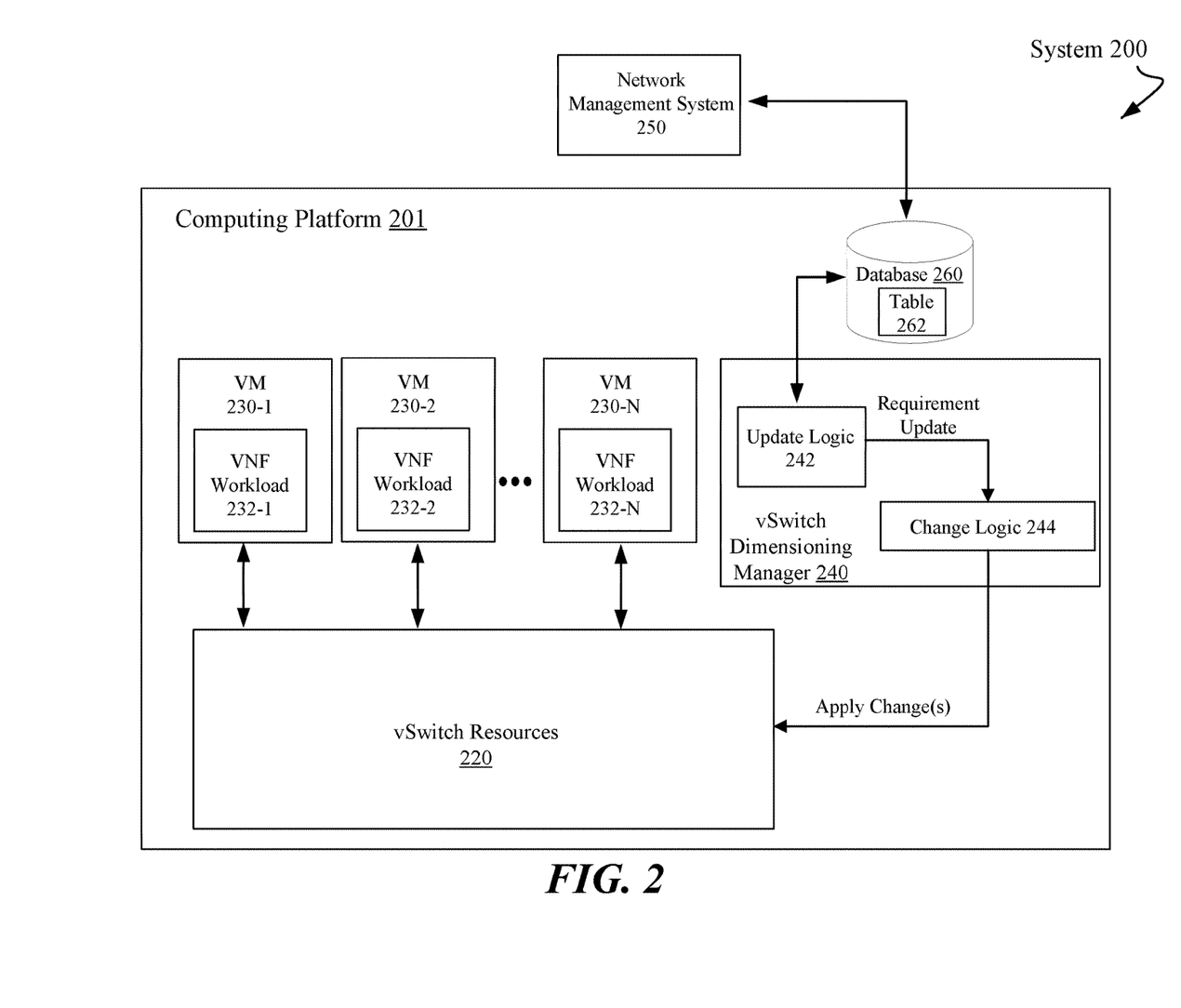
FIG. 2 illustrates a second example system.

FIG. 2 illustrates an example system 200. In some examples, as shown in FIG. 2, system 200 includes a computing platform 201 having vSwitch resources 220, VMs 230-1 to 230-N (where "n" is any positive whole integer greater than 2) and a vSwitch dimensioning manager 240. As described more below, vSwitch dimensioning manger 240 includes logic and/or features to determine whether to apply configuration changes to vSwitch resources 220 and still meet performance requirements associated with one or more VNF workloads 232-1 to 232-N supported by respective VMs 230-1 to 230-N. Although not shown in FIG. 2, containers implemented by VMs 230-1 to 230-N and may also support VNF workloads 232-1 to 232-N. As described more below, the configuration changes may be responsive to parameter changes indicated in a table such as table 262 maintained in a database such as database 260. Table 262 may have been changed or modified to indicate the parameter changes through a network management entity such as network management system 250. For these examples, other elements such as an operating system, network I/O device driver, circuitry, memory or network I/O devices as described for system 100 in FIG. 1 may be included in a computing platform similar to computing platform 201, but these other elements are not shown in order to simplify the description of particular processes or operations for system 200.

In some examples, VNF workloads 232-1 to 232-n, may represent workloads associated with respective applications for VNFs supported by elements of computing platform 201. For these examples, vSwitch resources 220 may be allocated or dimensioned to support intra-VM communications and/or process ingress/egress data packets received or transmitted from computing platform 201 in order to maintain or complete VNF workloads 231-1 to 232-n based on meeting performance requirements (e.g., SLAs). According to some examples, VNF workloads 232-1 to 232-n may be related to fulfilling a function, task or service that may include, but is not limited to, firewalling, domain service, network address translation, session border controller, caching, video-optimizer, content distribution network, wireless base station or radio network controller or wireless local area network access point or gateway. VNF workloads 232-1 to 232-2 may be related to all or least a portion of one or more functions, tasks or services supported by respective VMs 230-1 to 230-N.

According to some examples, logic and/or features of vSwitch dimensioning manager 240 such as update logic 242 and/or change logic 244 may be arranged to facilitate determinations of whether or not to apply configuration changes to vSwitch resources 220. For these examples, update logic 242 may be capable of monitoring table 262 maintained in database 260 and determine whether changes to parameter to configure a vSwitch have changed as indicated in table 262 such that a new dimensioning of vSwitch Resources 220 is needed. For example, network management system 250 may want to migrate a VM to computing platform 201 or may want to replace a current VM with another VM having a higher VNF workload. Both examples may require a need for adjustments or dimensioning of vSwitch Resources 220.

In some examples, as described more below, logic and/or features of vSwitch dimensioning manger 240 such as change logic 244 may perform dynamic or static checks to determine whether configuration changes may be applied to vSwitch resources 220 while maintaining performance requirements for completing VNF workloads 232-1 to 232-N. Performance requirements may be based on SLA requirements and may include, but are not limited to, meeting latency, data throughput, error rate thresholds or I/O bandwidth requirements and/or may be based on meeting a power budget allocated to computing platform 201.

According to some examples, database 260 may operate as an Open vSwitch Database (OVSDB). For these examples, update logic 242 or network management system 250 may use protocols described in Request for Comments (RFC) 7047, The Open vSwitch Database Management Protocol, published in December 2013, to access table 262. For these examples, table 262 may be an Open_vSwitch table including configuration information for configuring vSwitch resources 220 to handle network traffic according to a specification published by the Open Networking Foundation (ONF) such as the OpenFlow Switch specification, Version 1.5.1, published in March, 2015, and/or later versions of this OpenFlow Switch specification.

Figure 3:
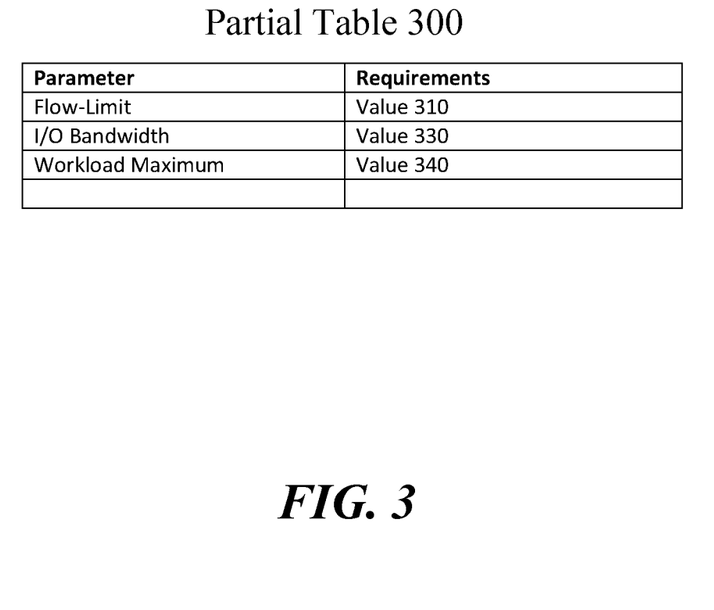
FIG. 3 illustrates an example partial table.

FIG. 3 illustrates an example partial table 300. According to some examples, partial table 300 may illustrate at least a portion of table 262 maintained in database 260 shown in FIG. 2 and mentioned above. As mentioned previously, table 262 may include vSwitch configuration information and may be arranged according the Open vSwitch specification. For these examples, partial table 300 indicates parameters to configure a vSwitch such as parameters for flow-limit, I/O bandwidth and workload maximum and respective values 310, 330 and 340. All or at least a portion of these parameters of partial table 300 may be maintained or included in a larger Open_vSwitch table. In some examples, values 310, 330 or 340 may be modified or changed through network management system 250 to reflect parameters for vSwitch operations to support a migration of a new VM (with or without containers) to computing platform 201 as well as maintaining support for current VMs hosted by computing platform 201.

According to some examples, value 310 for the flow-limit parameter may indicate a maximum number of flows allowed in a data path flow table (e.g., a forwarding information base (FIB) table) maintained at computing platform 201. The flow-limit parameter may be based on real-time network conditions to ensure that computing platforms coupled to a network do not disproportionately overburden a network managed by network management system 250. For example, value 310 may have a default value of 200,000 that may be raised or lowered based on real-time network conditions. For a vSwitch operating according to the Open vSwitch specification, value 310 for the flow-limit may be indicated in a "flow-limit" field of the Open_vSwitch table.

In some examples, value 330 for I/O bandwidth may indicate an amount of I/O bandwidth needed to support vSwitch operations for handling VMs to be hosted by computing platform 201. Value 330, for example may indicate a given I/O bandwidth (e.g., 40 gigabits per second (Gbps) needed to support the vSwitch operations. For a vSwitch operating according to the Open vSwitch specification, value 330 for I/O bandwidth may also be indicated in a field of the Open_vSwitch table. The field may be an "I/O_bandwidth" field or similar field that indicates an I/O bandwidth.

According to some examples, value 340 for workload maximum may indicate an expected peak or maximum load placed on vSwitch resources 220 in order to support vSwitch operations for handling VMs to be hosted by computing platform 201. Value 340, for example may indicate estimated or expected packet processing loads if all VNF workloads are at their highest level and thus place a peak or maximum load on vSwitch resources 220. For example, value 340 may indicate a maximum throughput for all VMs executing their respective VNF workloads during peak or maximum load. For a vSwitch operating according to the Open vSwitch specification, value 340 for the workload maximum may be also be indicted in a field of the Open_vSwitch table. The field may be a "workload_maximum" field or similar field that indicates a workload maximum.

Figure 4:
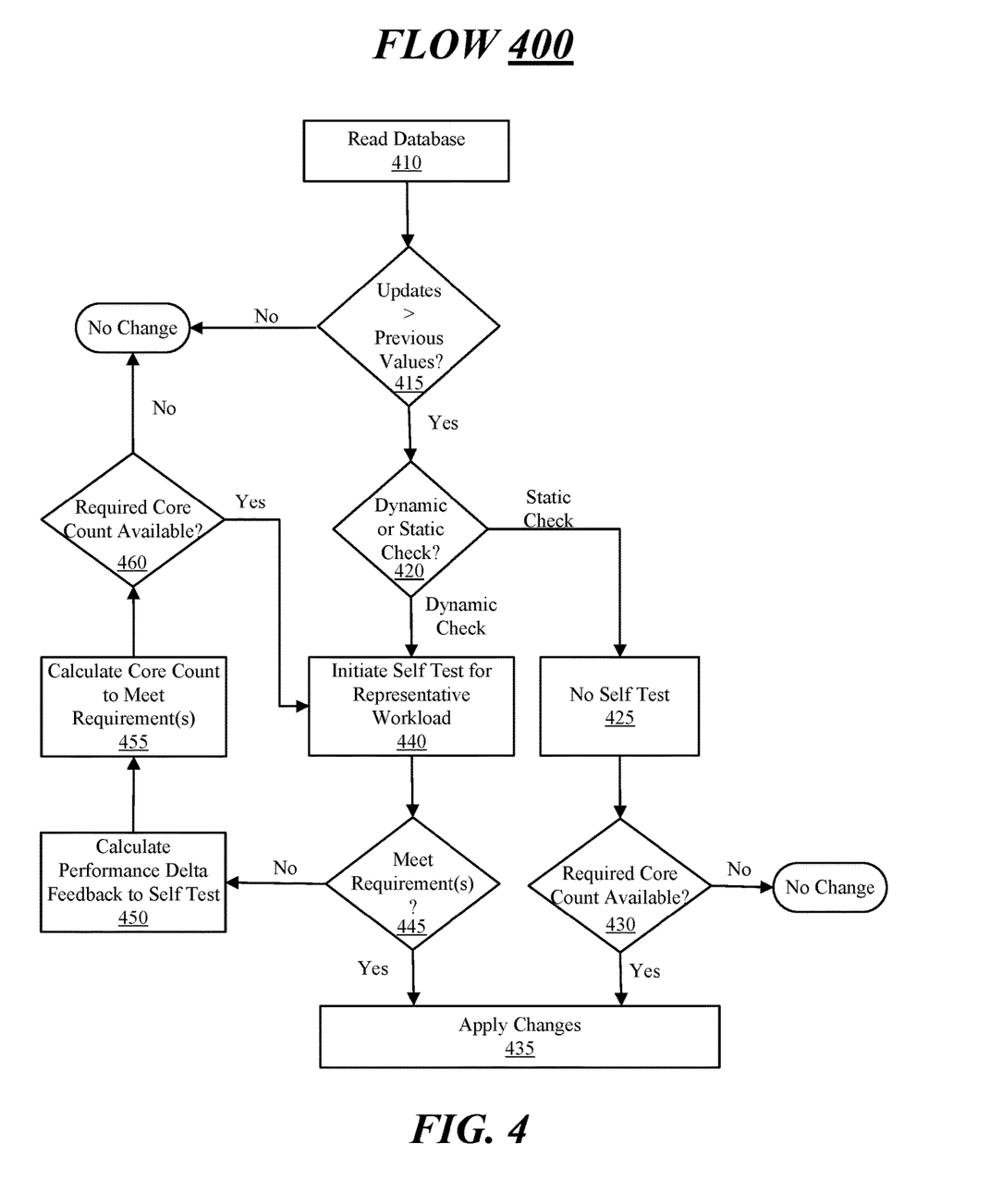
FIG. 4 illustrates a first logic flow.

FIG. 4 illustrates an example logic flow 400. In some examples, elements of systems 100 and 200 as shown in FIGS. 1 and 2 and the parameters shown in FIG. 3 may be used to illustrate example operations related to logic flow 400. The described example operations are not limited to implementations on systems 100 or 200 or to the parameters of partial table described therein for FIGS. 1-3.

Starting at block 410 (Read Database), logic and/or features of vSwitch dimensioning manager 240 such as update logic 242 may read database 260 in order to monitor table 261. Moving to decision block 415 (Updates>Previous Values?), update logic 242 may determine if any updates or modifications have been made to table 262. In some examples, if an update has been made to table 262, update logic 242 may then determine whether the updates increased at least some values of table 262. For example, an increasing of one or more values 310, 330 or 340 or partial table 300. For these examples, increasing values may indicate that at least some vSwitch dimensioning may be needed to accommodate a possible migration of a new VM or an increased VNF workload for VMs hosted by computing platform 201. If updates are greater than previous values for one or more of values 310, 330 or 340, logic flow moves to decision block 415. Otherwise, process flow 400 is done as no vSwitch dimensioning may be needed due to same or lower parameters indicated in values 310, 330 or 340.

Moving from decision block 415 to decision block 420 (Dynamic or Static Check?), logic and/or features of vSwitch dimensioning manager 240 such as change logic 244 may determine whether a dynamic or static check is to be conducted. In some examples, a static check may be desired if vSwitch resources 220 are at or near peak load to support VMs 230-1 to 230-N and a self test may possibly degrade performance of VNF workloads 232-1 to 232-N below SLA or other types of performance requirements. For these examples, logic flow moves to block 425. Otherwise, if vSwitch resources 220 are not at or near peak load and/or a self test can be performed and still meet performance requirement, logic flow moves to block 440.

Moving from decision block 420 to block 425 (No Self Test), logic and/or features of vSwitch dimensioning manager 240 such as change logic 244 may implement a static check that does not include a self test. In some examples, a number of cores required to meet changes to values 310, 330 or 340 of partial table 300 may be estimated statically be modelling behavior of vSwitch resources 220. One example of a model for when value 310 for flow-limit has increased is indicated below in example equation (1).

Example Equation (1)

$$\text{Number of } cpus \text{ required} = \left( flowlimit \div \left( \frac{cpu \text{ clock speed}}{\text{average } cpu \text{ cost per flow}} \right) \right)$$

Moving to decision block 430 (Required Core Count Available?), change logic 244 may determine whether CPU cores are available from among those allocated to vSwitch resources 220 to meet what the static check indicated as being needed. Using example equation (1) above as a model, a given flow-limit increase for value 310 may require more CPU cores than available to vSwitch resources 220. For this examples, no configuration changes would be made based at least on the change to value 310. If additional CPU cores are available, logic flow 400 moves to block 435.

Moving from decision block 430 to block 435 (Apply Changes), logic and/or features of vSwitch dimensioning manager 240 such as change logic 244 may apply changes to vSwitch resources 220 to utilize more CPU cores in order to adjust to the change in at least value 310.

Moving from decision block 420 to block 440, (Initiate Self Test for Representative Workload), logic and/or features of vSwitch dimensioning manager 240 such as change logic 244 may cause a dynamic check that includes initiation of a self test for a representative workload or workloads for VMs 230-1 to 230-N. In some examples, the representative workload may reflect peak demand loads (e.g., indicated in value 340) for VNF workloads 232-1 to 232-N and may also include a VNF workload supported by a possibly migrated VM.

Moving to decision block 445 (Meet Requirement(s)?), change logic 244 may determine whether computing platform 201 can meet one or more performance requirement(s) (e.g., SLAs) based on the self test. For example, if performance requirements for latency, data throughput, error rates or available data bandwidth are met, logic flow 400 moves to block 435 and change logic 244 applies the changes. Otherwise, logic flow 400 moves to block 450.

Moving from decision block 445 to block 450 (Calculate Performance Delta Feedback to Self Test), logic and/or features of vSwitch dimensioning manager 240 such as change logic 244 may calculate a performance delta feedback to determine what vSwitch resources 220 were lacking in computing platform 201's configuration that caused performance requirements to not be met. For examples, insufficient CPU cores to meet latency or data throughput requirements.

Moving to block 455 (Calculate Core Count to Meet Requirements), change logic 244 may calculate a core count to meet the performance requirements. For example, estimate (e.g., via use of a model) a number of additional CPU core resources to add to vSwitch resources 220 to lower latency times or increase data throughput in order to meet the performance requirements.

Moving to decision block 460 (Required Core Count Available?), change logic 244 may determine whether CPU cores are available from among those allocated to vSwitch resources 220 to meet what was estimated to be needed. If additional CPU cores are available, logic flow 400 moves to block 440 for initiation of another self test that now includes more CPU cores for vSwitch resources 220. If additional CPU cores are not available, no change is made and logic flow 400 is done.

As indicated above, logic flow 400 pertains to a particular vSwitch resource included in vSwitch resources 220 based on CPU core counts available. Examples are not limited to vSwitch dimensioning based on only CPU core counts. Other vSwitch resources included in vSwitch resources 220 such as, but not limited to memory allocations, CPU cache way allocations, I/O port allocations, etc. may also be considered when deciding whether to apply changes based on static or dynamic checks following updates or changes to parameter values maintained in partial table 300. Also, logic flow 400 describes VMs as supporting VNF workloads, examples are not limited to only VMs supporting VNF workloads. Examples, may include combinations of VMs and containers supporting a same or different VNF workloads.

Figure 5:
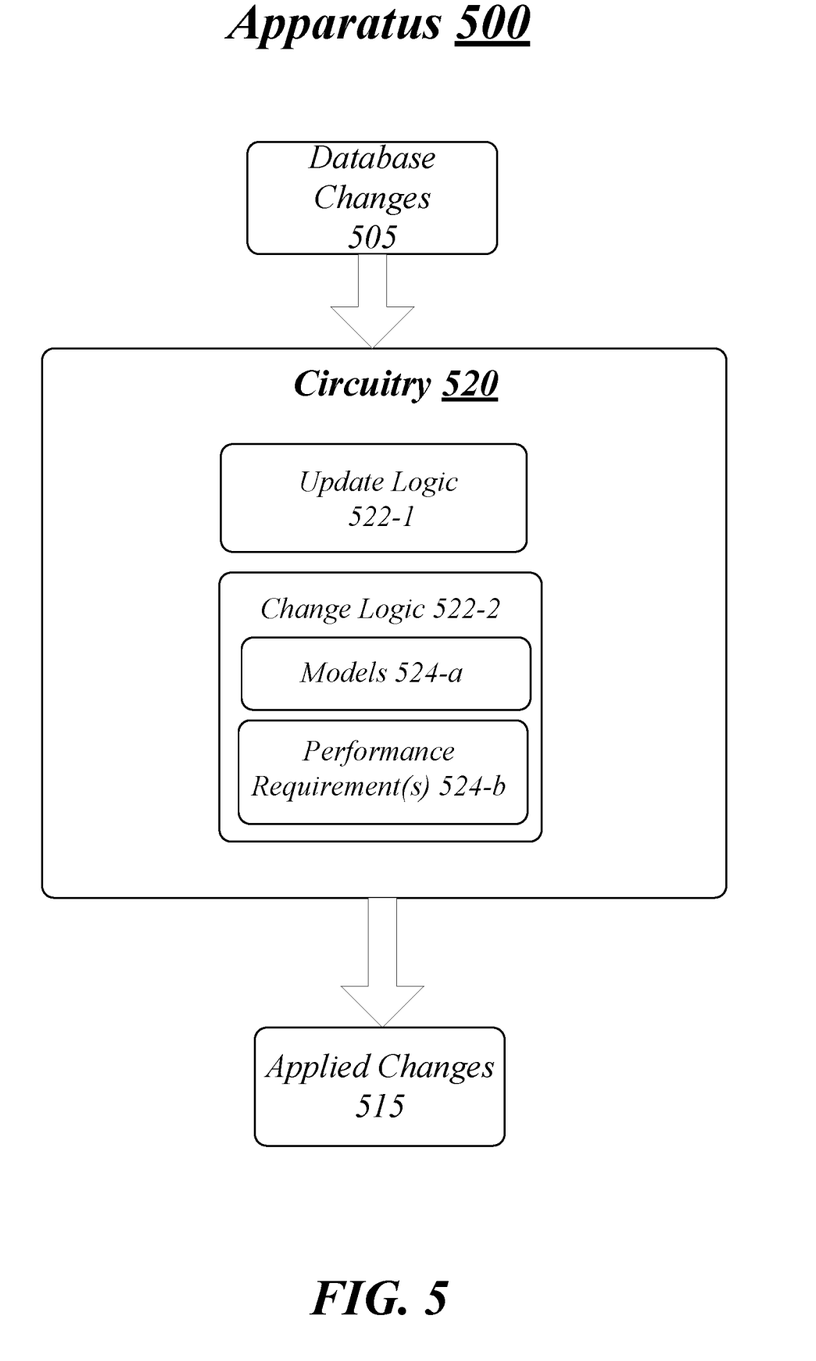
FIG. 5 illustrates an example block diagram for an apparatus.

FIG. 5 illustrates an example block diagram for apparatus 500. Although apparatus 500 shown in FIG. 5 has a limited number of elements in a certain topology, it may be appreciated that the apparatus 500 may include more or less elements in alternate topologies as desired for a given implementation.

According to some examples, apparatus 500 may be supported by circuitry 520. For these examples, circuitry 520 may be circuitry for a computing system, e.g., circuitry 120 as shown in FIG. 1. The circuitry for the computing system support one or more VMs and/or containers that may separately or collectively execute VNF workloads. Circuitry 520 may be arranged to execute one or more software or firmware implemented modules, components or logic 522-*a* (module, component or logic may be used interchangeably in this context). It is worthy to note that "a" and "b" and "c" and similar designators as used herein are intended to be variables representing any positive integer. Thus, for example, if an implementation sets a value for a=2, then a complete set of software or firmware for modules, components or logic 522-*a* may include logic 522-1 or 522-2. The examples presented are not limited in this context and the different variables used throughout may represent the same or different integer values. Also, "logic", "module" or "component" may also include software/firmware stored in computer-readable media, and although types of logic are shown in FIG. 5 as discrete boxes, this does not limit these types of logic to storage in distinct computer-readable media components (e.g., a separate memory, etc.).

According to some examples, circuitry 520 may include a processor, processor circuit or processor circuitry. Circuitry 520 may be generally arranged to execute one or more software components 522-*a*. Circuitry 520 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also include an application specific integrated circuit (ASIC) and at least some logic 522-*a* may be implemented as hardware elements of the ASIC. According to some examples, circuitry 520 may also include a field programmable gate array (FPGA) and at least some logic 522-*a* may be implemented as hardware elements of the FPGA.

According to some examples, apparatus 500 may include an update logic 522-1. Update logic 522-1 may be executed by circuitry 520 to monitor a database arranged to maintain parameters to configure a virtual switch at the computing platform including circuitry 520. Update logic 522-1 may determine whether the parameters to configure the virtual switch have been changed to indicate that additional computing resources at the computing platform are to be allocated to the virtual switch. In some examples, database changes may be included in database changes 505.

In some examples, apparatus 500 may include a change logic 522-2. Change logic 522-2 may be executed by circuitry 520 to implement a static check or a dynamic check to determine whether or not to allocate the additional computing resources, the static check to include an estimation of the additional computing resources needed based on a static model, the dynamic check to include running a self test for a representative workload executed by the plurality of VMs to determine whether the additional computing resources are needed. Change logic 522-2 may also cause an allocation of the additional computing resources to configure the virtual switch based on the static or dynamic check. What additional computing resources to be allocated may be included in applied changes 515. In some examples, the static model may be maintained by change logic 522-2 in models 524-*a* (e.g., in a look up table (LUT)).

In some examples, change logic 522-2 may determine that implementing the dynamic check causes the plurality of VMs or the virtual switch to fail to meet one or more performance requirements to include a latency threshold requirement, a data throughput requirement or an error rate requirement. Change logic 522-2 may then implement the static check based on the determination that implementing the dynamic check causes the plurality of VMs, containers or the virtual switch to fail to meet the one or more performance requirements. For these examples, change logic 522-2 may maintain the one or more performance requirements in performance requirement(s) 524-*b* (e.g., in a LUT).

Various components of apparatus 800 and a device or node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
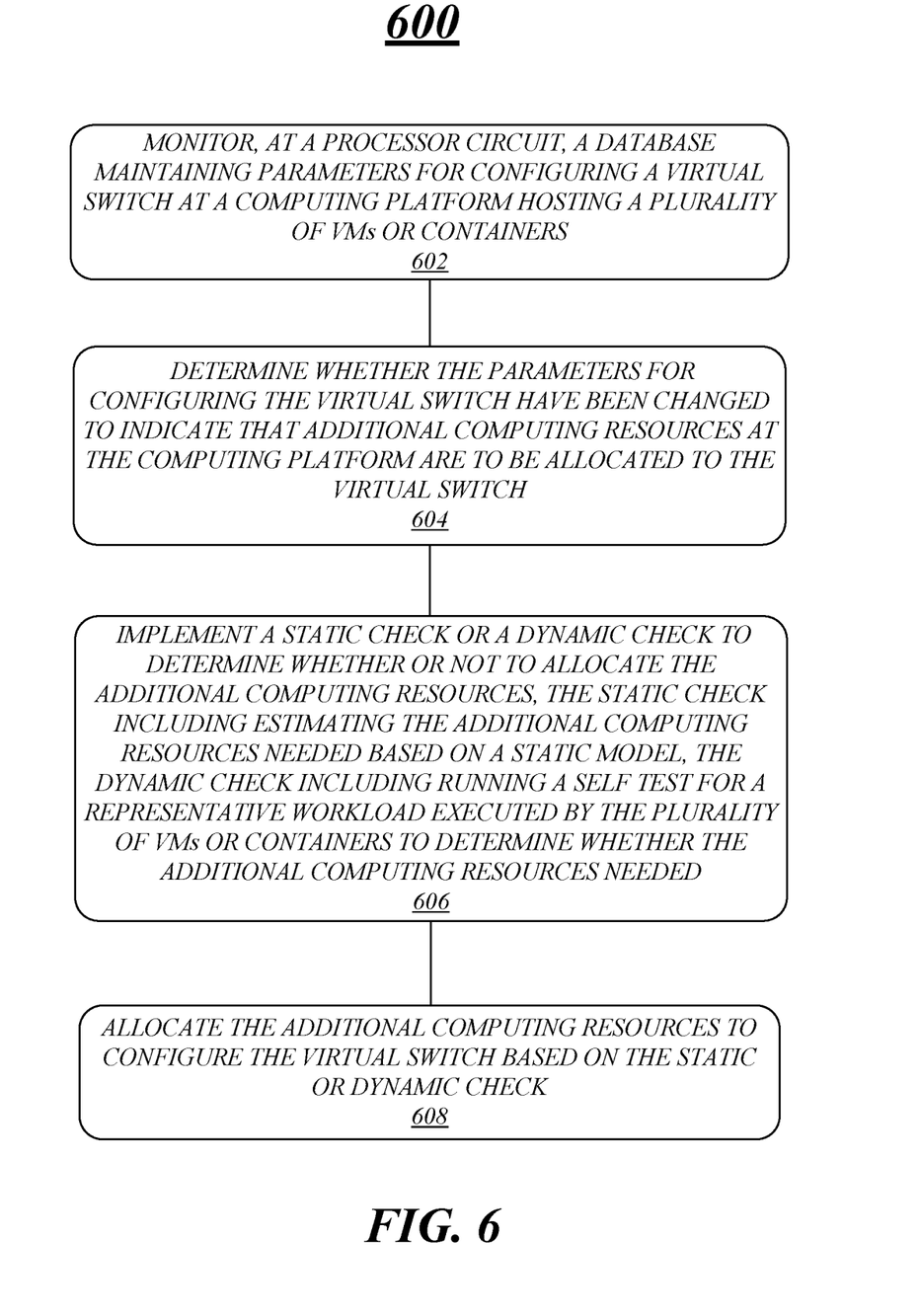
FIG. 6 illustrates an example of a second logic flow.

FIG. 6 illustrates an example of a logic flow 600. Logic flow 600 may be representative of some or all of the operations executed by one or more logic, features, or devices described herein, such as apparatus 600. More particularly, logic flow 600 may be implemented by at least update component 522-1 or change component 522-2.

According to some examples, logic flow 600 at block 602 may monitor, at a processor circuit, a database maintaining parameters for configuring a virtual switch at a computing platform hosting a plurality of VMs or containers. For these examples, Update logic may monitor the database.

In some examples, logic flow 600 at block 604 may determine whether the parameters for configuring the virtual switch have been changed to indicate that additional computing resources at the computing platform are to be allocated to the virtual switch. For these examples, update logic 622-1 may determine whether the parameters have been changed.

In some examples, logic flow 600 at block 606 may implement a static check or a dynamic check to determine whether or not to allocate the additional computing resources, the static check including estimating the additional computing resources needed based on a static model, the dynamic check including running a self test for a representative workload executed by the plurality of VMs or containers to determine whether the additional computing resources are needed. For these examples, change logic 622-2 may implement the static or dynamic check.

According to some examples, logic flow 600 at block 608 may allocate the additional computing resources to configure the virtual switch based on the static or dynamic check. For these examples, change logic 622-1 may cause the allocation of the additional computing resources.

Figure 7:
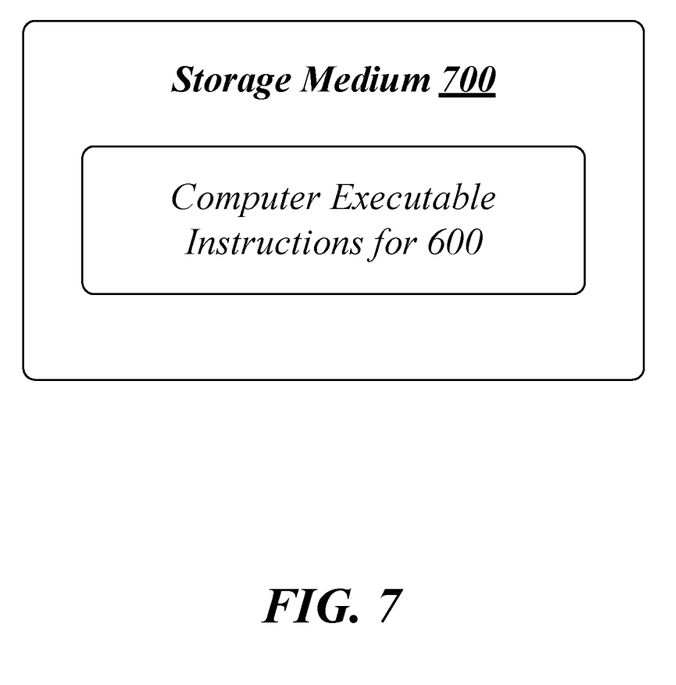
FIG. 7 illustrates an example of a storage medium.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
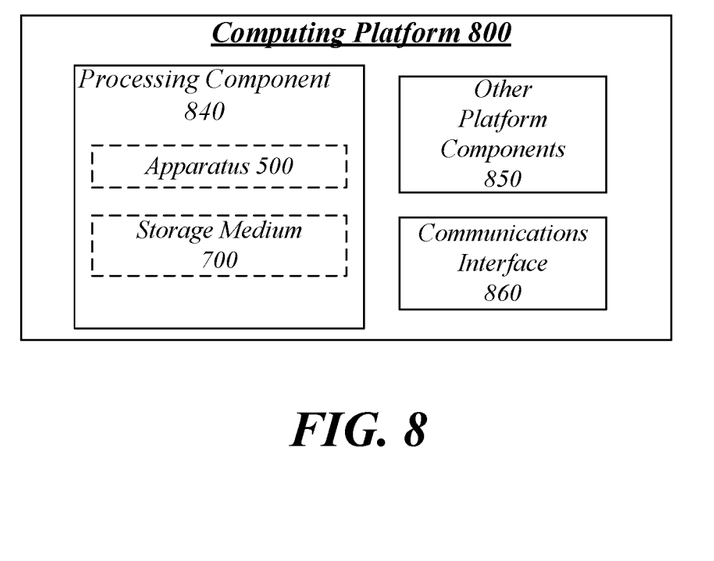
FIG. 8 illustrates an example computing platform.

FIG. 8 illustrates an example computing platform 800. In some examples, as shown in FIG. 8, computing platform 800 may include a processing component 840, other platform components 850 or a communications interface 860.

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2012, Carrier sense Multiple access with Collision Detection (CSMA/CD) Access Method and Physical Layer Specifications, Published in December 2012 (hereinafter "IEEE 802.3 specification"). Network communication may also occur according to one or more OpenFlow specifications such as the OpenFlow Hardware Abstraction API Specification. Network communications may also occur according to Infiniband Architecture specification.

Computing platform 800 may be implemented in a server or client computing device. Accordingly, functions and/or specific configurations of computing platform 800 described herein, may be included or omitted in various embodiments of computing platform 800, as suitably desired for a server or client computing device.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1

An example apparatus may include circuitry for a computing platform arranged to host a plurality of VMs or containers. The apparatus may also include update logic for execution by the circuitry to monitor a database arranged to maintain parameters to configure a virtual switch at the computing platform and determine whether the parameters to configure the virtual switch have been changed to indicate that additional computing resources at the computing platform are to be allocated to the virtual switch. The apparatus may also include change logic for execution by the circuitry to implement a static check or a dynamic check to determine whether or not to allocate the additional computing resources. The static check may include an estimation of the additional computing resources needed based on a static model. The dynamic check may include running a self test for a representative workload executed by the plurality of VMs or containers to determine whether the additional computing resources are needed. The update logic may also cause an allocation of the additional computing resources to configure the virtual switch based on the static or dynamic check.

Example 2

An apparatus of example 1, the change logic to determine that implementing the dynamic check causes the plurality of VMs, containers or the virtual switch to fail to meet one or more performance requirements to include a latency threshold requirement, a data throughput requirement or an error rate requirement. The change logic may implement the static check based on the determination that implementing the dynamic check causes the plurality of VMs, containers or the virtual switch to fail to meet the one or more performance requirements.

Example 3

The apparatus of example 1, the parameters to configure the virtual switch comprises a flow-limit, input/output bandwidth or a workload maximum.

Example 4

The apparatus of example 3, the parameters to configure the virtual switch may be changed based on migrating an additional VM or container to the computing platform.

Example 5

The apparatus of example 1, the additional computing resources may include additional CPU cores, additional memory allocations, additional input/output port allocations or additional CPU cache way allocations.

Example 6

The apparatus of example 1, the database may be an Open vSwitch Database (OVSDB) arranged to operate in accordance with an OpenFlow Switch specification.

Example 7

The apparatus of example 6, the parameters to configure the virtual switch may be included in an Open_vSwitch table maintained in the OVSDB.

Example 8

The apparatus of example 1 may also include a digital display coupled to the circuitry to present a user interface view.

Example 9

An example method may include monitoring, at a processor circuit, a database maintaining parameters for configuring a virtual switch at a computing platform hosting a plurality of VMs or containers. The method may also include determining whether the parameters for configuring the virtual switch have been changed to indicate that additional computing resources at the computing platform are to be allocated to the virtual switch. The method may also include implementing a static check or a dynamic check to determine whether or not to allocate the additional computing resources. The static check may include estimating the additional computing resources needed based on a static model. The dynamic check may include running a self test for a representative workload executed by the plurality of VMs or containers to determine whether the additional computing resources are needed. The method may also include allocating the additional computing resources to configure the virtual switch based on the static or dynamic check.

Example 10

The method of example 9 may also include determining that implementing the dynamic check causes the plurality of VMs, containers or the virtual switch to fail to meet one or more performance requirements including a latency threshold requirement, a data throughput requirement or an error rate requirement. The method may also include implementing the static check based on the determination that implementing the dynamic check causes the plurality of VMs, containers or the virtual switch to fail to meet the one or more performance requirements.

Example 11

The method of example 9, the parameters for configuring the virtual switch may include a flow-limit, input/output bandwidth or a workload maximum.

Example 12

The method of example 11, the parameters for configuring the virtual switch may be changed based on migrating an additional VM or container to the computing platform.

Example 13

The method of example 9, the additional computing resources may include additional CPU cores, additional memory allocations, additional input/output port allocations or additional CPU cache way allocations.

Example 14

The method of example 9, the database comprising an Open vSwitch Database (OVSDB) operating in accordance with an OpenFlow Switch specification.

Example 15

The method of example 14, the parameters for configuring the virtual switch may be included in an Open_vSwitch table maintained in the OVSDB.

Example 16

An examples at least one machine readable medium may include a plurality of instructions that in response to being executed by a system may cause the system to carry out a method according to any one of examples 9 to 15.

Example 17

An example apparatus may include means for performing the methods of any one of examples 9 to 15.

Example 18

An example at least one machine readable medium may include a plurality of instructions that in response to being executed by a system at a computing platform may cause the system to monitor a database maintaining parameters to configure a virtual switch at the computing platform, the computing platform hosting a plurality of VMs or containers. The instructions may also cause the system to determine whether the parameters to configure the virtual switch have been changed to indicate that additional computing resources at the computing platform are to be allocated to the virtual switch. The instructions may also cause the system to implement a static check or a dynamic check to determine whether or not to allocate the additional computing resources. The static check may include an estimation of the additional computing resources needed based on a static model. The dynamic check may include running a self test for a representative workload executed by the plurality of VMs or containers to determine whether the additional computing resources needed. The instructions may also cause the system to allocate the additional computing resources to configure the virtual switch based on the static or dynamic check.

Example 19

The at least one machine readable medium of example 18, the instructions may further cause the system to determine that implementing the dynamic check causes the plurality of VMs, containers or the virtual switch to fail to meet one or more performance requirements to include a latency threshold requirement, a data throughput requirement or an error rate requirement. The instructions may also cause the system to implement the static check based on the determination that implementing the dynamic check causes the plurality of VMs, containers or the virtual switch to fail to meet the one or more performance requirements.

Example 20

The at least one machine readable medium of example 18, the parameters to configure the virtual switch may include a flow-limit, input/output bandwidth or a workload maximum.

Example 21

The at least one machine readable medium of example 20, the parameters to configure the virtual switch may be changed based on migrating an additional VM or container to the computing platform.

Example 22

The at least one machine readable medium of example 18, the additional computing resources may include additional CPU cores, additional memory allocations, additional input/output port allocations or additional CPU cache way allocations.

Example 23

The at least one machine readable medium of example 18, the database may be an Open vSwitch Database (OVSDB) arranged to operate in accordance with an OpenFlow Switch specification.

Example 24

The at least one machine readable medium of example 23, the parameters to configure the virtual switch may be included in an Open_vSwitch table maintained in the OVSDB.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   circuitry for a computing platform arranged to host a plurality of virtual machines (VMs) or containers;
   update logic for execution by the circuitry to monitor a database arranged to maintain parameters to configure a virtual switch at the computing platform and determine whether the parameters to configure the virtual switch have been changed to indicate that additional computing resources at the computing platform are to be allocated to the virtual switch; and change logic for execution by the circuitry to:
implement a static check or a dynamic check to determine whether or not to allocate the additional computing resources, the static check to include an estimation of the additional computing resources needed based on a static model, the dynamic check to include running a self test for a representative workload executed by the plurality of VMs or containers to determine the additional computing resources are needed; and
cause an allocation of the additional computing resources to configure the virtual switch based on the static or dynamic check.

2. The apparatus of claim 1, comprising the change logic to:
determine that implementing the dynamic check causes the plurality of VMs, containers or the virtual switch to fail to meet one or more performance requirements to include a latency threshold requirement, a data throughput requirement or an error rate requirement; and
implement the static check based on the determination that implementing the dynamic check causes the plurality of VMs, containers or the virtual switch to fail to meet the one or more performance requirements.

3. The apparatus of claim 1, the parameters to configure the virtual switch comprises a flow-limit, input/output bandwidth or a workload maximum.

4. The apparatus of claim 3, comprising the parameters to configure the virtual switch are changed based on migrating an additional VM or container to the computing platform.

5. The apparatus of claim 1, comprising the additional computing resources to include additional central processing unit (CPU) cores, additional memory allocations, additional input/output port allocations or additional CPU cache way allocations.

6. The apparatus of claim 1, the database comprising an Open vSwitch Database (OVSDB) arranged to operate in accordance with an OpenFlow Switch specification.

7. The apparatus of claim 6, the parameters to configure the virtual switch are included in an Open_vSwitch table maintained in the OVSDB.

8. The apparatus of claim 1, comprising a digital display coupled to the circuitry to present a user interface view.

9. A method comprising:
monitoring, at a processor circuit, a database maintaining parameters for configuring a virtual switch at a computing platform hosting a plurality of virtual machines (VMs) or containers;
determining whether the parameters for configuring the virtual switch have been changed to indicate that additional computing resources at the computing platform are to be allocated to the virtual switch;
implementing a static check or a dynamic check to determine whether or not to allocate the additional computing resources, the static check including estimating the additional computing resources needed based on a static model, the dynamic check including running a self test for a representative workload executed by the plurality of VMs or containers to determine the additional computing resources are needed; and
allocating the additional computing resources to configure the virtual switch based on the static or dynamic check.

10. The method of claim 9, comprising:
determining that implementing the dynamic check causes the plurality of VMs, containers or the virtual switch to fail to meet one or more performance requirements including a latency threshold requirement, a data throughput requirement or an error rate requirement; and
implementing the static check based on the determination that implementing the dynamic check causes the plurality of VMs, containers or the virtual switch to fail to meet the one or more performance requirements.

11. The method of claim 9, the parameters for configuring the virtual switch comprises a flow-limit, input/output bandwidth or a workload maximum.

12. The method of claim 11, comprising the parameters for configuring the virtual switch are changed based on migrating an additional VM or container to the computing platform.

13. The method of claim 9, comprising the additional computing resources including additional central processing unit (CPU) cores, additional memory allocations, additional input/output port allocations or additional CPU cache way allocations.

14. The method of claim 9, the database comprising an Open vSwitch Database (OVSDB) operating in accordance with an OpenFlow Switch specification.

15. The method of claim 14, the parameters for configuring the virtual switch are included in an Open_vSwitch table maintained in the OVSDB.

16. At least one non-transitory machine readable medium comprising a plurality of instructions that in response to being executed by a system at a computing platform cause the system to:
monitor a database maintaining parameters to configure a virtual switch at the computing platform, the computing platform hosting a plurality of virtual machines (VMs) or containers;
determine whether the parameters to configure the virtual switch have been changed to indicate that additional computing resources at the computing platform are to be allocated to the virtual switch;
implement a static check or a dynamic check to determine whether or not to allocate the additional computing resources, the static check to include an estimation of the additional computing resources needed based on a static model, the dynamic check including running a self test for a representative workload executed by the plurality of VMs or containers to determine the additional computing resources are needed; and
allocate the additional computing resources to configure the virtual switch based on the static or dynamic check.

17. The at least one non-transitory machine readable medium of claim 16, comprising the instructions to further cause the system to:
determine that implementing the dynamic check causes the plurality of VMs, containers or the virtual switch to fail to meet one or more performance requirements to include a latency threshold requirement, a data throughput requirement or an error rate requirement; and
implement the static check based on the determination that implementing the dynamic check causes the plurality of VMs, containers or the virtual switch to fail to meet the one or more performance requirements.

18. The at least one non-transitory machine readable medium of claim 16, the parameters to configure the virtual switch comprises a flow-limit, input/output bandwidth or a workload maximum.

19. The at least one non-transitory machine readable medium of claim 18, comprising the parameters to configure the virtual switch are changed based on migrating an additional VM or container to the computing platform.

20. The at least one non-transitory machine readable medium of claim 16, comprising the additional computing resources to include additional central processing unit (CPU) cores, additional memory allocations, additional input/output port allocations or additional CPU cache way allocations.

21. The at least one non-transitory machine readable medium of claim 16, the database comprising an Open vSwitch Database (OVSDB) arranged to operate in accordance with an OpenFlow Switch specification.

22. The at least one non-transitory machine readable medium of claim 21, the parameters to configure the virtual switch are included in an Open_vSwitch table maintained in the OVSDB.

* * * * *